(12) United States Patent
Agrawal et al.

(10) Patent No.: US 7,639,289 B2
(45) Date of Patent: Dec. 29, 2009

(54) INCREASING OBJECT RESOLUTIONS FROM A MOTION-BLURRED IMAGE

(75) Inventors: Amit Agrawal, Somerville, MA (US); Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 295 days.

(21) Appl. No.: 11/761,516

(22) Filed: Jun. 12, 2007

(65) Prior Publication Data

US 2008/0062287 A1 Mar. 13, 2008

Related U.S. Application Data

(63) Continuation-in-part of application No. 11/430,233, filed on May 8, 2006.

(51) Int. Cl.
*H04N 5/262* (2006.01)
*G06K 9/40* (2006.01)
*G06K 9/32* (2006.01)

(52) U.S. Cl. .................. 348/239; 382/255; 382/299

(58) Field of Classification Search ............ 348/208.99, 348/208.6, 208.13, 222.1, 239, 367; 382/255, 382/299
See application file for complete search history.

(56) References Cited

U.S. PATENT DOCUMENTS

| 6,778,210 B1 * | 8/2004 | Sugahara et al. ......... 348/208.4 |
| 2005/0057687 A1 * | 3/2005 | Irani et al. ................... 348/441 |
| 2006/0132709 A1 * | 6/2006 | Olivier et al. ............... 351/206 |
| 2007/0258706 A1 * | 11/2007 | Raskar et al. ................. 396/52 |
| 2009/0154823 A1 * | 6/2009 | Ben-Ezra et al. ............ 382/255 |

\* cited by examiner

*Primary Examiner*—Jason Whipkey
(74) *Attorney, Agent, or Firm*—Dirk Brinkman; Gene Vinokur

(57) ABSTRACT

A method increases a resolution of a moving object in an image acquired of a scene by a camera. The image scene is temporally modulated according to a temporally encoding pattern, while integrating the image in a camera sensor to produce a blurred input image. The blurred input image is resolved according to the temporally encoding pattern to produce an enhanced and deblurred output image in which the object has an increased resolution.

17 Claims, 11 Drawing Sheets

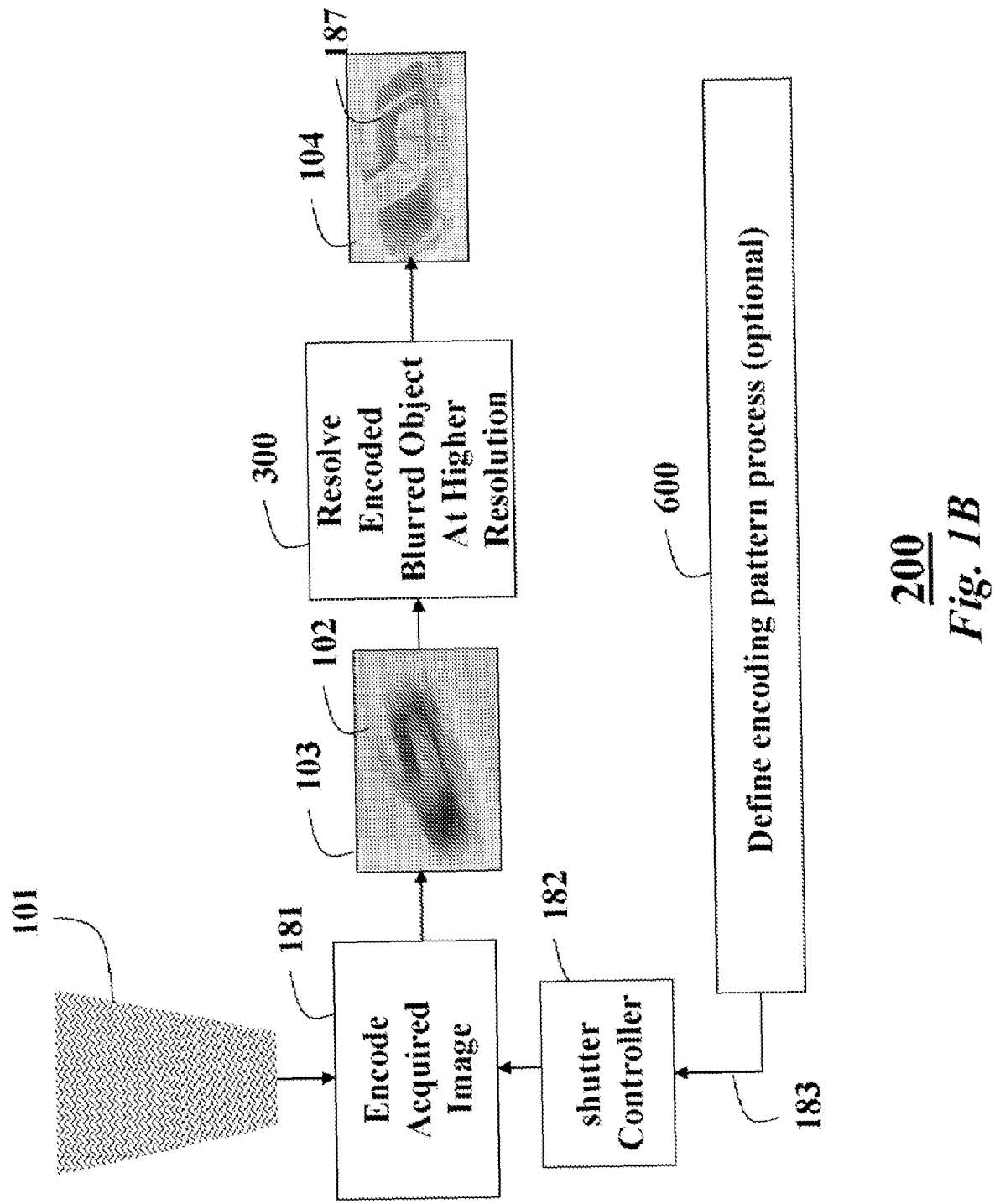

300

INCREASING OBJECT RESOLUTIONS FROM A MOTION-BLURRED IMAGE

RELATED APPLICATION

This application is continuation-in-part of U.S. patent application Ser. No. 11/430,233 entitled "Method and Apparatus for Deblurring Images" filed by Raskar on May 8, 2006.

FIELD OF THE INVENTION

This invention related generally to image processing, and more particularly to removing motion blur effects in images acquired of a moving object.

BACKGROUND OF THE INVENTION

Resolution

Digital cameras are useful in both consumer and professional applications. Generally, digital cameras can acquire a digital image of an object or a scene. The acquired image can then be transferred to a computer system for rendering, inserted as a graphical object into an electronic document, stored in a storage device, or output to a printing device, among other actions. In addition, there are other means of generating a digital image, e.g., by scanning photographs.

A variety of camera capabilities are available. One important camera feature that can significantly impact the cost of a digital camera is its resolution, which is typically measured in pixels. Camera resolutions can range from thousands to millions of pixels. The image resolution determines the level of detail in an image. Thus, higher resolution cameras typically enhance the appearance of images. A higher resolution also generally translates into higher cost. Nevertheless, many users wish to find a camera or other digital image capture device that provides enhanced appearance at a low price.

Motion Blur

FIG. 1C shows the effect of motion blur to be removed according to the embodiments of the invention. Motion blur is the apparent streaking: due to a moving object in an image. For example, if a static object in an image is represented by 10×20 pixels, and the object is moving horizontally, the moving object in the blurred image 192 might become 10×40 pixels, with the increase being in a direction of the motion. Motion blur can degrade the quality of the image, and is considered a nuisance for computer vision applications. Motion blur is the result of relative motion between the camera and the scene during an integration or 'exposure time' while acquiring an image. Motion blurred images can be restored up to lost spatial frequencies by image deconvolution, provided that the motion is shift-invariant, at least locally, and that a blur function, also known as a point spread function (PSF), which caused, the blur is known. That is, conventional deblurring can, at best, recover a relatively reasonable appearing 10×20 object.

It is an object of the invention to recover an enhanced appearing object at an increased resolution, e.g., 10×40 pixels.

Several methods are known for deblurring and resolution enhancement.

Super Resolution (SR)

Super resolution (SR) refers to an image processing method for increasing a resolution of an image acquired by a low-resolution camera sensor. Typically, super resolution operates on entire images, and not on specific objects in the images. Numerous methods, which combine multiple low-resolution images into a single high resolution image have been described in the prior art, e.g., H. Ur and D. Gross: "Improved resolution from sub-pixel shifted pictures," CVGIP: Graphical Models and Image Processing, volume 54, pages 181-186, 1992.

In those methods, the relative motion between the camera and a scene is estimated. Then, all images are registered to a reference image. The images are combined to obtain a high resolution image. However, the motion blur in individual images significantly degrades the quality of the super-resolution. It is a goal of the invention to increase the resolution of blurred objects without degrading the quality of the image.

Another method uses a jitter camera. There, the sensor was modified to obtain four images using controlled sub-pixel detector shifts, see M. Ben-Ezra, A. Zomet, and S. Nayar: "Video super-resolution using controlled subpixel detector shifts," IEEE Trans. Pattern Anal. Machine Intell., 27:977-987, June 2005.

High resolution recovery of 1-D features was described by F. Champagnat, G. Le Besnerais, and C. Kulesar: "Continuous super-resolution for recovery of 1-D image features: Algorithm and performance modeling," Proc. Conf. Computer Vision and Pattern Recognition, volume 1, pages 916-926, 2006. However, their method is restricted because of an assumption that each row or column of pixels in the low resolution image results from the sampling of the same signal with different shifts.

Single image SR is an under-constrained problem. Most of the previous work can be classified into: (a) reconstruction based methods, where a high resolution image is desired so that after down-sampling, the high resolution image is as close as possible to the low resolution input image, (b) learning based Bayesian methods using training dataset and image priors, and (c) functional interpolation, which results in blurring of discontinuities in the image.

Neighbor embedding and tensor voting have also been described for single image SR, see H. Chang, D.-Y. Yeung, and Y. Xiong: "Super-resolution through neighbor embedding," Proc. Conf. Computer Vision and Pattern Recognition, volume 1, pages 275-282, 2004, and Y.-W. Tai, W.-S. Tong, and C.-K. Tang: "Perceptually-inspired and edge-directed color image super-resolution," Proc. Conf Computer Vision and Pattern Recognition, volume 2, pages 1948-1955, 2006.

Both motion deblurring and resolution enhancement from multiple images are ill-posed problems for images acquired by a conventional camera.

Motion Deblurring

Image deblurring and deconvolution are well-known. Blind image deconvolution attempts to infer concurrently a sharp image and the PSF from a given image, based on various assumptions applied to the PSF.

Bayesian methods assume specific image prior probabilities, such as a Poisson distribution as in the well-known Richardson-Lucy method for astronomical images or natural image statistics for consumer photography.

Ben-Ezra et al. describes a hybrid camera where a low resolution video camera was used to estimate the PSF. The PSF was then used to deblur high resolution image from a digital still camera, see M. Ben-Ezra and S. Nayar: "Motion-based Motion Deblurring," IEEE Trans. on Pattern Analysis and Machine Intelligence, 26(6); 689-698, June 2004.

Coded Sampling

Methods to preserve spatial frequencies for subsequent reconstruction include coded aperture imaging, frequently used in astronomy to overcome the limitations of a pinhole camera. There, a Modified Uniformly Redundant Arrays (MURA) is used for coding and decoding a light distribution of distant stars using a circular convolution and deconvolution.

Broadband codes are used in spread-spectrum techniques and code-division multiplexing. Broadband sequences are used as training sequences for channel estimation in communication systems over time-dispersive channels.

A coded exposure camera can preserve high spatial frequencies in a motion-blurred image and make the deblurring process well-posed, see U.S. patent application Ser. No. 11/429,694, "Method for Deblurring Images using Optimized Temporal Coding Patterns" filed by Raskar et al. on May 5, 2006, and incorporated hearing by reference.

It is desired to increase the resolution of a moving object in a motion-blurred image.

SUMMARY OF THE INVENTION

The embodiments of the invention provide a system and a method for increasing a resolution of a moving object in a motion-blurred image. The invention utilizes the information in the motion-blurred image without requiring any training images. As the blur size increases, the resolution of the moving object can be increased by a larger factor.

Conventionally, motion deblurring and super-resolution have been ill-posed problems. Using a coded-exposure camera that preserves high spatial frequencies in the blurred image, the invention provides a linear method for the combined problem of deblurring and resolution enhancement and analyzes the invertibility of the resulting linear system.

Also, embodiments of the invention describe methods for selectively enhance the resolution of a narrow region of high-frequency features, when the resolution of the entire moving object in the image cannot be increased due to the small motion blur. The resolution of a moving object can be enhanced by utilizing information from the motion blur, when the blur size is sufficiently large.

In practice, resolution enhancement is ill-posed and produces meaningless reconstruction in the presence of noise. By using a coded-exposure camera, the invertibility of the resolution enhancement is improved.

BRIEF DESCRIPTION OF THE DRAWINGS

FIG. 1B is a flow diagram of a method for increasing an object resolution according an embodiment of the invention;

DETAILED DESCRIPTION OF PREFERRED EMBODIMENT

Figure 1A:
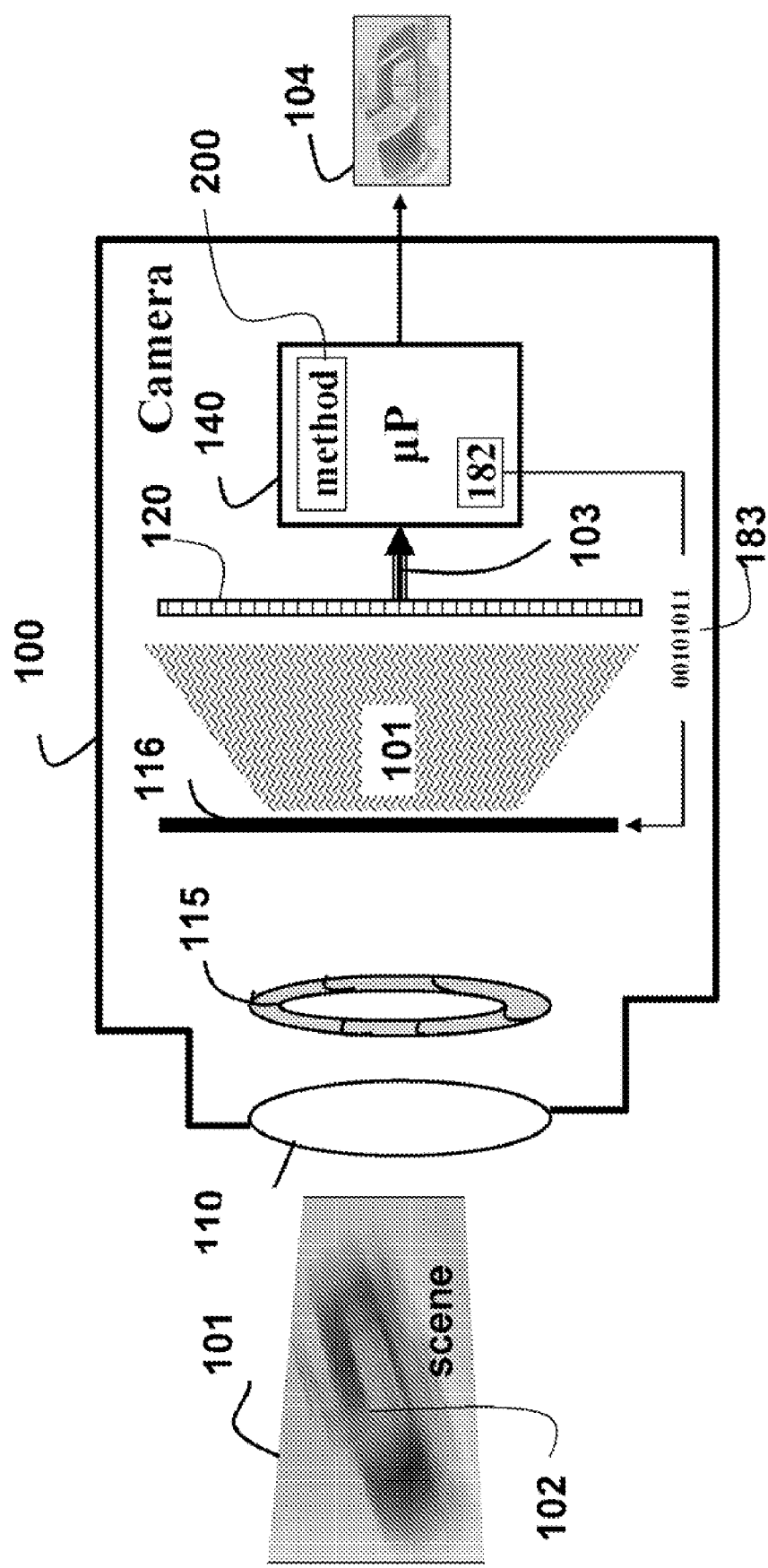
FIG. 1A is a schematic of a coded exposure camera according to embodiments of the invention.

As shown in FIGS. 1A and 1B, the embodiments of our invention provide a camera 100 and a method 200 for increasing a resolution of an object (taxi) 102 in an input image acquired of a scene 101. By object resolution, we mean the number of pixels that represent the object in the image. We can increase this number of pixels related to the object without increasing the overall resolution of the image itself. Furthermore, we increase the object resolution to enhance the appearance of the otherwise blurred object.

Figure 1C:
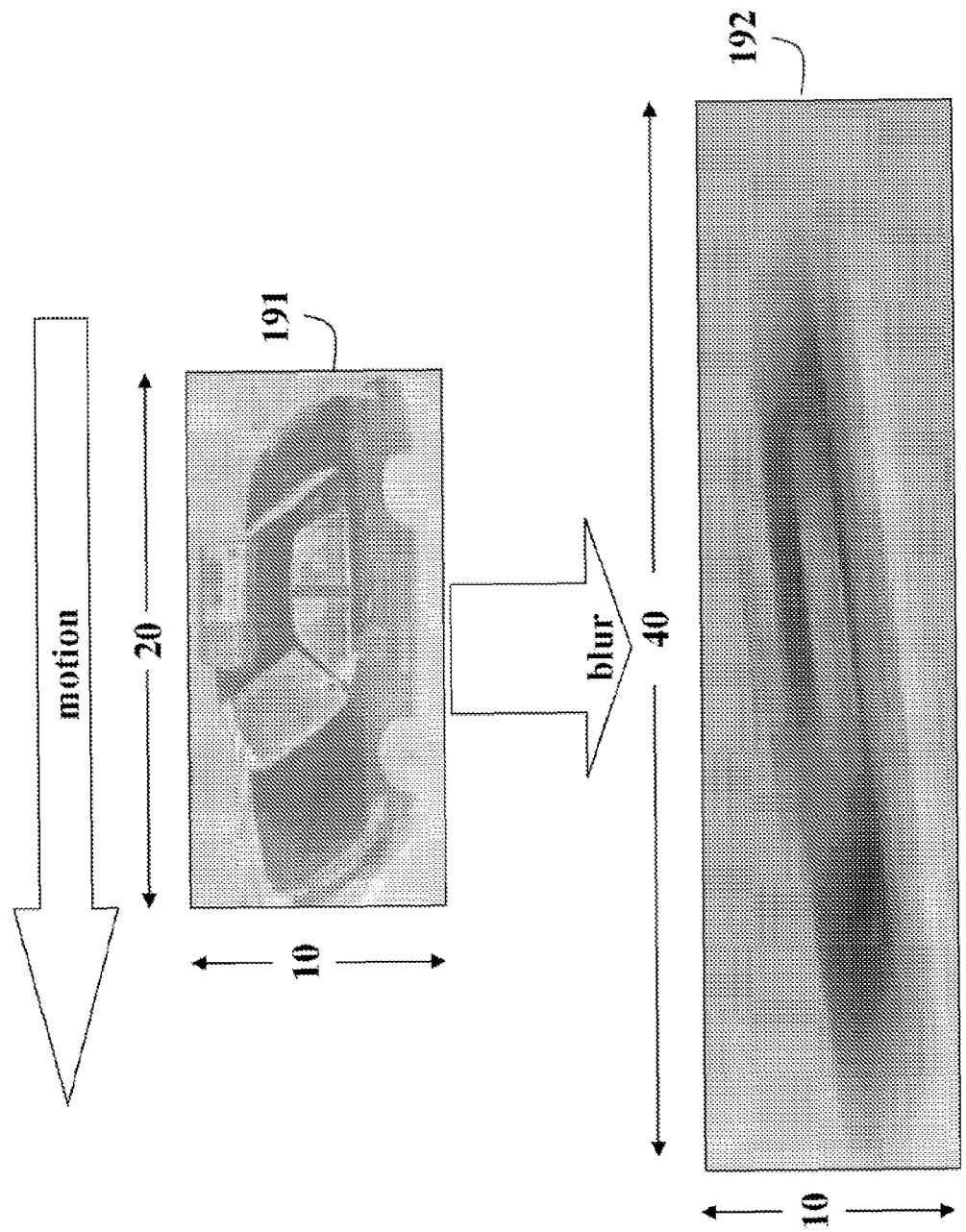
FIG. 1C is a diagram of the motion blur effect removed according to the embodiments of the invention.

The blurring of the object is a result of relative motion between the object 102 and the camera 100, see FIG. 1C. The camera 100 includes a conventional lens 110, a conventional aperture 115 and a conventional sensor 120. The lens can include multiple elements, as in a compound lens, to correct for aberrations, coma, and distortion. The scanner can be a CCD line-scanner with three RGB color channels. The camera also includes a shutter 116, which is operated by a shutter controller 182 as described herein.

The cameras also include a microprocessor (μP) 140 that can be used to implement the methods described herein, and operate the shutter 116. Basically, the microprocessor receives a 2D blurred input image 103 from the sensor 120, which encodes an image of a scene 101, and can generate an enhanced output image 104.

FIG. 1B shows the method 200 for increasing the pixel resolution of a moving object in an input image. The image of a scene 101 is modulated and encoded 181 by a shutter controller 182 using an on/off encoding pattern 183 defined by encoding pattern process 600 to produce an encoded input image 103 including, perhaps, the motion blurred object 102. The encoded image 103 is decoded 300 to produce an output image 104 with a deblurred object 187 having an enhanced appearance.

The encoding patterns and its usage in the deblurring images methods are described in U.S. patent application Ser. No. 11/429,694, "Method for Deblurring Images using Optimized Temporal Coding Patterns" filed by Raskar et al. on May 8, 2006, and incorporated hearing by reference.

Assumptions and Terminology

We acquire a single input image 103 of the dynamic scene 101. We assume lens optical blur is smaller than one pixel, in case a high resolution sensor is used. Also, we assume that the object 102 moves substantially coplanar to the image sensor 120.

For simplicity of this description, the embodiments of our invention are implemented for 1-D linear motions of the object 102 in a plane of focus, although the embodiments of the invention can be extended to more complex object motions and camera motion. Thus, we increase the number of pixels along the direction of the motion. We use a known point spread function (PSF) for the motion blur. Alternatively, the PSF can be specified by describing the direction and extent of motion for 1-D linear motions. For practical image enhancement, we assume that the general appearance, e.g., shape and texture, of the object 102 during the exposure time remains invariant.

We describe quantities acquired by the sensor using a subscript s. An image acquired of a static scene with the sensor 120 is $u_s$. Then, the motion blurred image b 103 can be modeled as $$b = h_{sensor} * h_{motion} * h_{lens} * u_s + \eta, \quad (1)$$
$$= h_{sensor} * h_{motion} * x_s + \eta,$$

where * denotes convolution, $x_s$ the enhanced appearance output image 104, $\eta$ denotes noise in the imaging process, and $h_{lens}$, $h_{motion}$ and $h_{sensor}$ denote the PSFs of the lens, motion and sensor.

We assume that pixels of the sensor 120 are square, thus the sensor has a square PSF related to the pixel size. The motion $h_{motion}$ depends on the exposure time used to acquire the input image 103.

An increased object resolution, as defined herein, is a result of the process for inverting the combined effects of $h_{sensor}$ and $h_{motion}$. We assume the lens PSF is less than one pixel in a high resolution sensor. Alternatively, the resolution can be improved only up to the PSF of the lens.

Thus, our desired enhanced appearance output image 104 of the moving object 102 is $$x_s = (h_{lens} * u_s).$$

In addition, we assume that the object moves linearly line with a constant speed during the exposure time, leading to a spatially invariant PSF motion.

Conventional Deblurring Transformation

Figure 2:
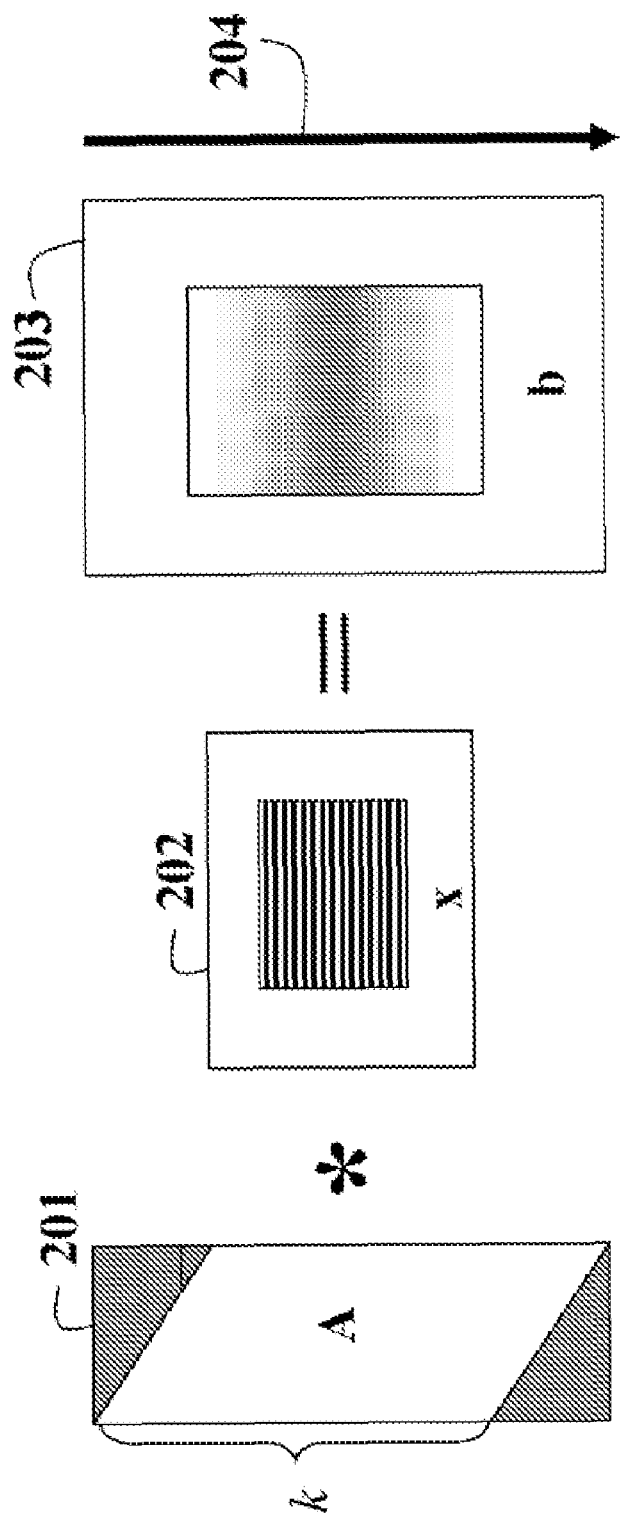
FIG. 2 is a block diagram of a conventional deblurring method.
Figure 3:
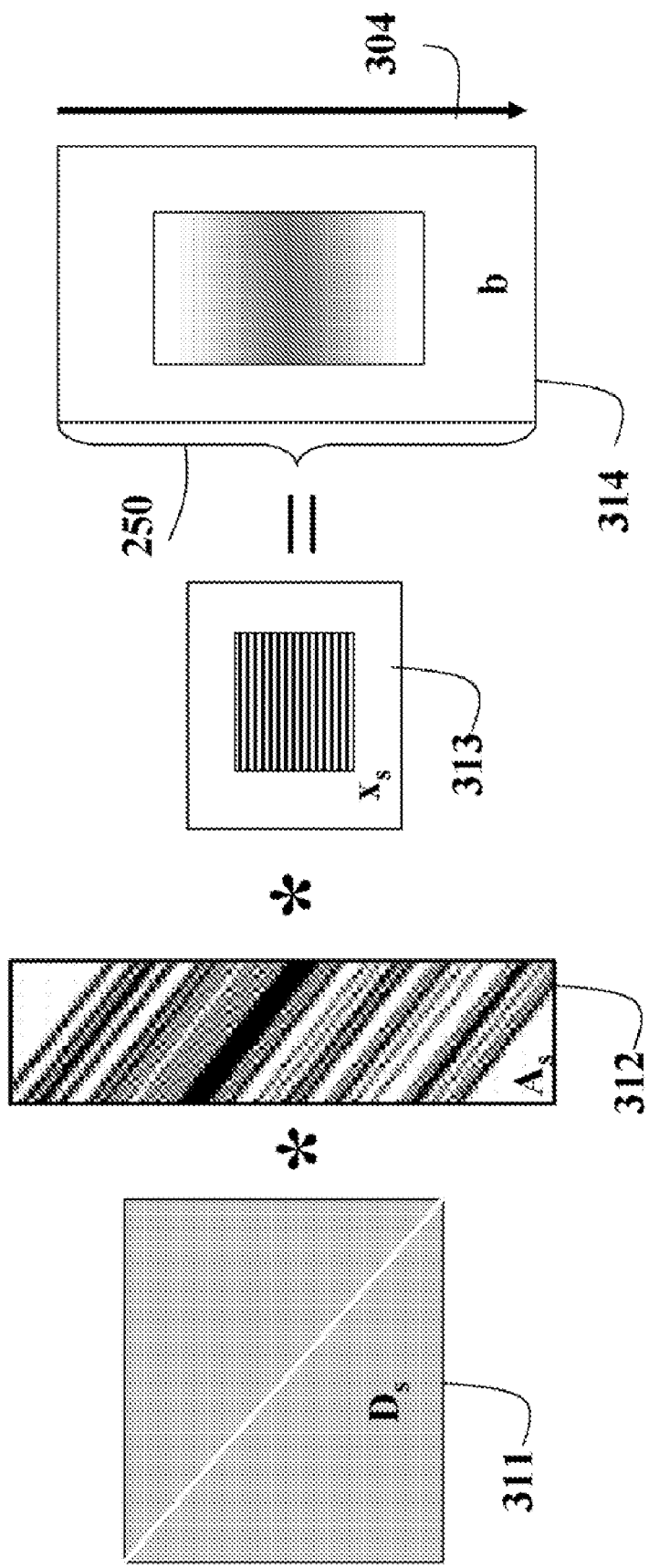
FIG. 3 is a block diagram of a process for increasing an object resolution according an embodiment of the invention.

FIG. 2 show conventional motion blurring. FIG. 3 shows encoded motion blurring according to the invention. In FIG. 2, a matrix A 201 is a "smear" matrix for a blur of k pixels. The output image is x 202, and the blurred input image is b 203, and motion is indicated by the arrow 204, thus, $$Ax=b, \quad (3)$$

Conventional deblurring can only invert the effect of the motion $h_{motion}$ at the same resolution.

Resolution Enhanced Deblurring

In contrast, the invention inverts the effect of motion blurring at an increased resolution. FIG. 3 shows method according to the embodiment of our invention, which inverts the combine effect of $h_{motion}$ and $h_{sensor}$ by modeling the blurring process. In FIG. 3 there is a decimating matrix $D_s$ 311, a smear matrix 312, an output image 313, and an input image 314. Note the encoding pattern, described in greater detail below, in the matrix 312, cf. FIG. 2.

Let s denote a resolution enhancement factor (REF). A size of the blur 250 in the sensor output image 103 is k pixels. For the purpose of the example shown in FIG. 3, the arrow 304 shows the direction of movement of the object 102.

A height of the static object is n. In a blurred image, the height is increased to $n_s = n*s$ due to the vertical motion blur. The width of the object is w. Then, each column of the input image b is blurred in the vertical direction for the moving object, and has t=k+n−1 pixels due to a linear convolution.

Discretizing, as defined herein, relates the enhanced output image $x_s$, with an increased object resolution, to the blurred input image b as:

$$D_s * A_s * x_b = b$$

$$K_s * x_s = b. \quad (2)$$

The smearing matrix, representing motion blur in the sensor grid, is $A_s$, and a decimation matrix due to $h_{sensor}$ is $D_s$. Each row of the decimation matrix $D_s$ has only REF s ones, with each column having at most a single one. Each column of the smearing matrix $A_s$ corresponds to a circularly shifted PSF vector of length s*k zero-padded to the size of the increased resolution object in the output image $x_s$, representing linear convolution. The combined deblurring and decimation matrix $K_s = *D_s * A_s$. Equation (2) is a linear system.

In contrast with the prior art, the embodiments of the invention invert the combined effect of the motions $h_{motion}$ and the sensors $h_{sensor}$ by modeling the motion blur process at an increased resolution, followed by decimation. Equation (2) can also be written as $$D_s * A_s * x_s = D_s * b_s = b, \quad (4)$$

where $b_s$ is the motion-blurred image.

A simple counting argument shows that the number of observations t in the low resolution motion blurred image should be greater than the number of unknown $n_s$ for resolution enhancement. Thus, $$t \geq n_s,$$

$$(n+k-1) \geq n*s, \text{ and}$$

$$k \geq n*(s-1)+1. \quad (5)$$

Thus, motion blur k has to be sufficiently large. The motion blur k is sufficiently large, as defined herein, means that the motion blur k is larger than the size of the object in the direction of the motion by a factor of s−1 for increasing the resolution by a factor of s. For example, if REF s=4, then the object in the scene should move more than three times size of the object in the direction of the motion.

Invertibility of Resolution Enhancement

In practice, the linear system of the Equation (2) is ill-posed. Deblurring and super-resolution are ill-posed problems. Baker et al. analyzed the theoretical limits on super-resolution from multiple images, assuming that the images are perfectly registered S. Baker and T. Kanade: "Limits on super-resolution and how to break them," IEEE Trans. Pattern Anal. Machine Intell., 24:1167-1183, September 2002. They show that for a square PSF, the reconstruction constraints are not invertible, and the condition number, for integer magnification factors greater than one, is infinity. The linear system is not invertible because high frequencies are lost in the sensor output due to motion blur and low resolution, resulting in zeros in the frequency spectrum of the PSF's. Any motion blur in individual images is bad for super-resolution using multiple images.

Coded Exposure Imaging

The embodiments of our invention use the coded exposure camera 100 to preserve high spatial frequencies in the motion-blurred image 103. The coded exposure camera is a modification of a conventional camera in terms of the integration of light within a single effective exposure time.

Instead of keeping the shutter open for the entire exposure duration, the coded exposure camera "flutters" the shutter open and closed according to a selected pseudo-random binary encoding pattern 183 within a single image. In other words, we are temporally modulating, according to the temporally encoding pattern 183, the image acquired of the scene 101. The result of the modulation is the temporally encoded image 103 of the scene 101, which includes the encoded blurred object 102. For static parts of the scene, this only results in reducing the effective exposure time. However, for the moving objects, e.g., object 102, the resulting motion-blurred image exhibits encoded blur, in contrast with the continuous blur for a conventional camera, compare the smearing matrices in FIGS. 2 and 3.

The blurred input image 103 is a convolution of the static image with the temporal encoding pattern used for modulating the exposure. Effectively, the motion PSF is changed from a low pass box filter to a broadband filter. A frequency response of this broadband filter depends on the binary code used for fluttering the shutter. Because the resulting motion PSF becomes broadband and does not have zeros in its frequency spectrum, resolution enhancement, according to the embodiments of the invention, becomes a well-posed invertible problem.

FIG. 3 shows the process 300 for resolving blurred object with increased resolution. In order to solve the linear system of Equation (2), the matrix $A_s$ 312 is changed when the exposure is coded, as described below. For a conventional camera, the motion PSF is a box filter, represented as all ones in each column of the matrix $A_s$. By coding the exposure according to the embodiments of the invention, the matrix $A_s$ is changed to reflect the binary code.

Figure 4:
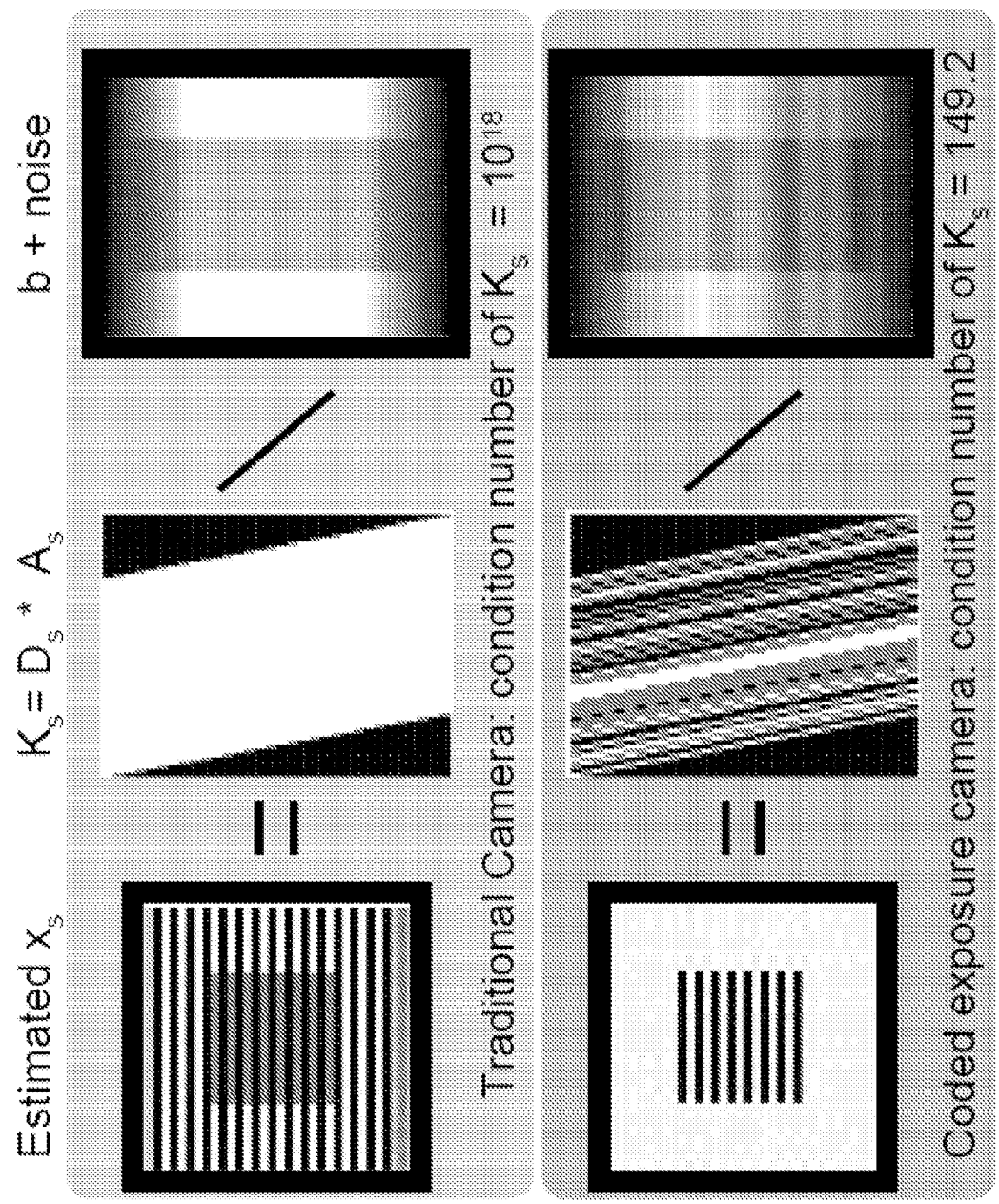
FIG. 4 is schematic of a difference between methods for resolving an image at high resolution using the conventional camera and the coded exposure camera according an embodiment of the invention.

In one embodiment of the invention, the coded exposure solves the system of Equation (2), see FIG. 4. We compare the estimated output image $x_s$ in presence of noise in the blurred input image b. We add zero mean Gaussian noise ($\sigma$=0.1) to the input image b as shown. FIG. 4 compares the estimated output images $x_s$ using a traditional camera, and our coded exposure camera by solving the linear system of Equation (2).

Note that the condition number of the matrix $K_s$ for the conventional camera is of the order of 1018. In contrast, the condition number of matrix $K_s$ using the coded exposure camera 100 is only 149.2. Thus, even with a small amount of noise, the linear system of Equation (2) is non-invertible for a conventional camera but becomes invertible using the coded exposure camera 100.

Theoretical Analysis

Consider a length m of an encoding pattern according to which the shutter of the camera is open and closed within one exposure time. We describe the relationship between the length m, the blur size k, and the REF s. We analyze Equation (2) in terms of the noise covariance of the estimated high resolution image $x_s$. For the linear system Ax=b, assuming independent and identically distributed (IID) Gaussian noise in blurred image b with mean 0 and variance $\sigma^2$, the covariance matrix of the estimated output image $\hat{x}$ is given by $\sigma^2 \Sigma$, where $$\Sigma = (A^T A)^{-1}.$$

The mean square error (MSE) of the estimated output image $\hat{x}$ is $$\frac{\sigma^2}{n} \text{Trace}(\Sigma).$$

Thus, the signal to noise ratio (SNR) is defined as $$\frac{n}{\text{Trace}(\Sigma)}.$$

Fast Broadband Encoding Pattern Search

In one embodiment, the process 600 for defining the encoding pattern 183 is based on maximizing a minimum of a fast Fourier transform (FFT) of the zero padded code so that the frequency spectrum of the motion PSF does not have zeros in its frequency spectrum. When the encoding pattern length is short, we can find a near optimal code using a linear search.

For resolution enhanced deblurring, however, we encounter long encoding pattern. The linear search is computationally prohibitive for larger encoding pattern lengths m, e.g., $m \geq 100$, where the search space grows exponentially. We provide a randomized search where the length m of encoding pattern is randomly generated, and stored if the current encoding pattern is better than previous encoding pattern. Thus, we store only the current best encoding pattern. The encoding pattern search is performed only one time for a given length m. However, if the system specifications are known, e.g., the approximate blur size k and REF s, then we maximize the signal to noise ratio SNR, as described below, in searching for the encoding pattern.

Blur Size and Encoding Pattern Length for REF s=1

Figure 6A:
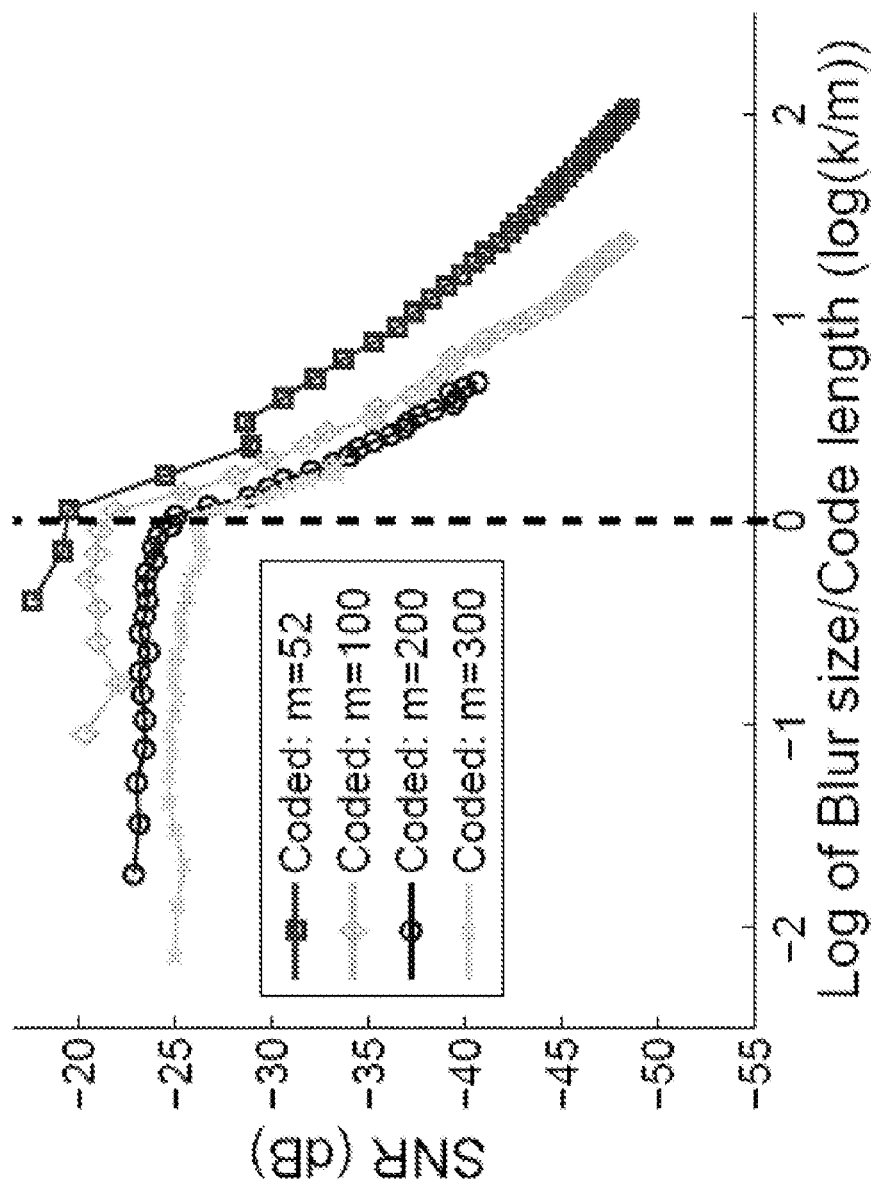
FIGS. 6A-6D are graphs of relationships among encoding pattern length, blur size, and REF.

We first describe the relationship between blur size k and encoding pattern length m for conventional deblurring (s=1). FIG. 6A shows graphs of the SNR (in dB) versus relative blur size k/m for fixed object size (n=25 pixels) for coded exposure camera using different code lengths m. For each m, the best encoding pattern was found as described above. Note the for each graph, the SNR remains high until k is equal to m (log(k/m)=0). Thus, a encoding pattern of length m is most effective when the blur size k is equal to length m.

Figure 6B:
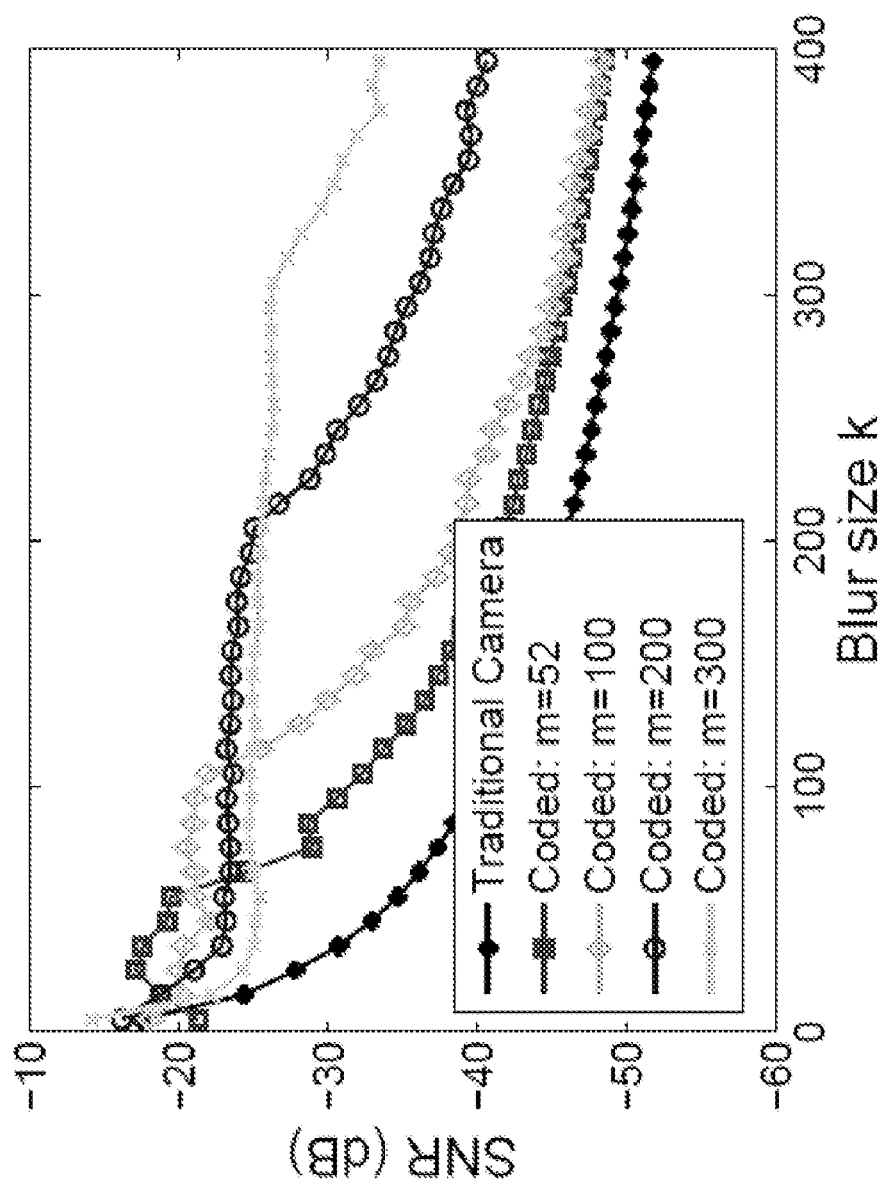

FIG. 6B shows the same graphs as shown in FIG. 6A along with the SNR plot for a conventional camera. The x-axis is changed to the blur size k for fair comparison with the conventional camera. For a small blur (k≈10 pixels), the coded-exposure camera performs similar to a conventional camera. As the blur size increases, the performance of the coded-exposure camera improves significantly. Note that for k≦52, SNR is highest for m=52, for 50<k≦100, SNR is highest for m=100, emphasizing that: the length m should be close to blur size k.

Blur Size and Encoding Pattern Length for REF s=2

Figure 6C:
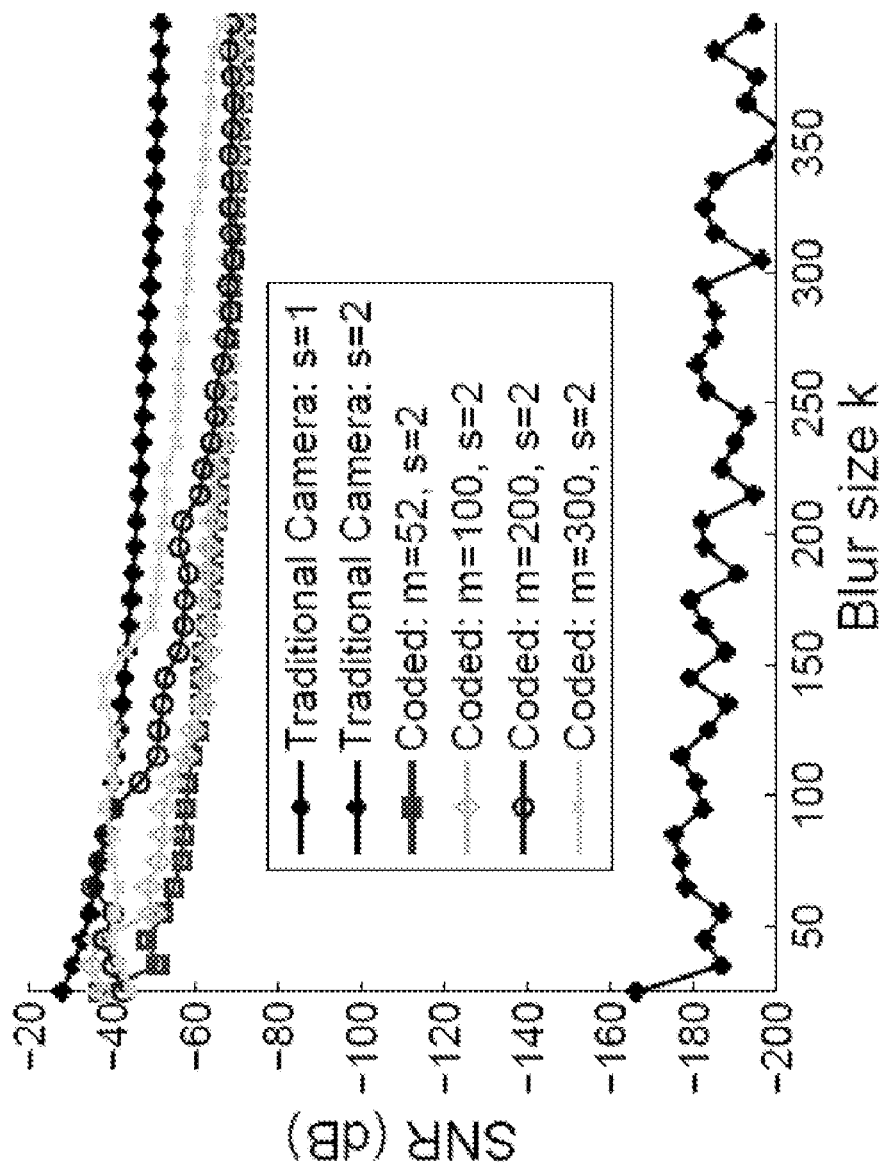

FIG. 6C shows graphs of the SNR similar to FIG. 6B but for REF s=2. The SNR for the conventional camera degrades sharply even for small motion blur, making it impractical for resolution enhancement. In comparison, the coded-exposure camera 100 makes the linear system of Equation (2) more stable. For the length m, the corresponding curve peaks at k≈m.

SNR and REF

Figure 6D:
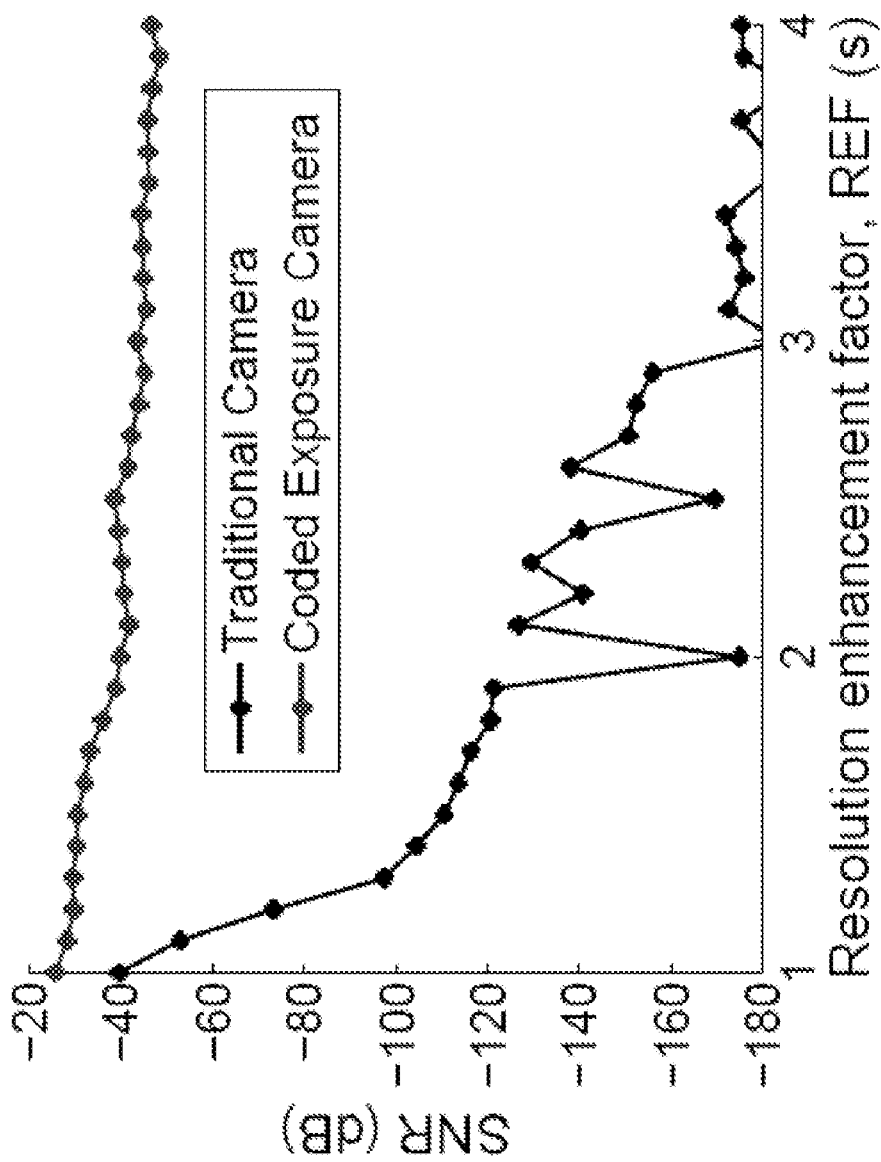

FIG. 6D shows the graphs of SNR versus resolution enhancement factor s for the blur size k=100 pixels, the height of the object in at the low resolution n=25 pixels and the encoding pattern length m=400. Again, the performance of a conventional camera degrades quickly even with small values of REF s. The SNR values are low for integer values of REF. As REF increases, the SNR decreases even for the coded exposure camera 100. Thus, higher resolution enhancement leads to more noise in the estimated image.

Selective Enhancement of Resolution

Other embodiments of our invention deal with cases when the blur size k is not sufficiently large, in another word insufficiently large. The motion blur size k is insufficiently large, as defined herein, means that the motion blur size k is smaller than the size of the object in the direction of the motion by a factor of s−1 when it is desired to achieve resolution enhancement by a factor of s.

We might be interested in increasing the resolution of a small patch, e.g., a logo or text, on an object rather than the entire object itself. In our embodiments, we selectively increase the resolution of an object patch in an image to handle such cases. The key idea is that although motion blur may be small compared to the size of the object, it might be large enough compared to the size of an individual patch or region of interest on the object to facilitate an increase in object patch resolution.

The resolution of a narrow patch P on an object is increased selectively when the motion blur of the object is small. To achieve this, we reorganize the linear system of Equation (2) so as to assume more unknowns on the patch P and fewer unknowns on surrounding regions.

If a patch P of height $n^p$ is surrounded by patches L and R of heights $n^l$ and $n^r$ respectively so that $$n = n^l + n^p + n^r, \quad (6)$$

where n is the height of the object in the low resolution image.

Figure 5:
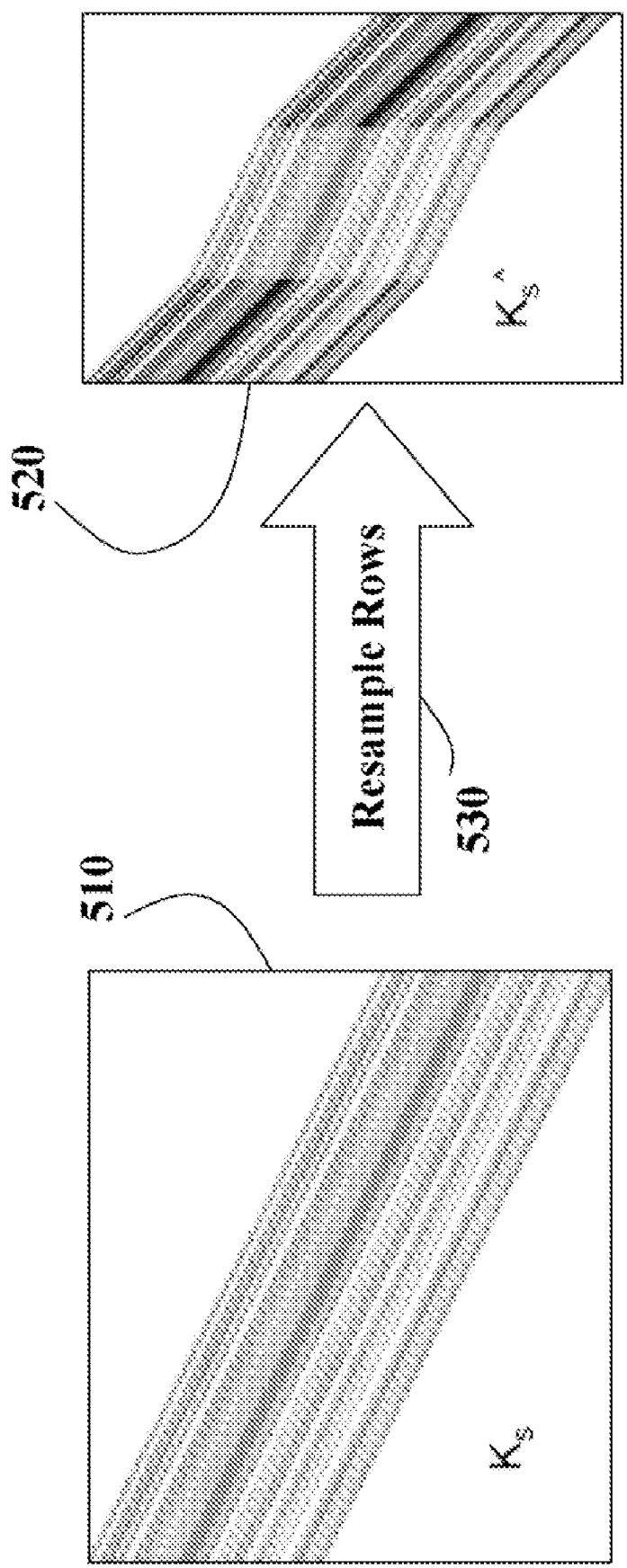
FIG. 5 is a block diagram of a method for selective resolution enhancement according an embodiment of the invention.

In cases when in Equation (5) the number of observations t is less then s*n, the resolution of the entire object cannot be increased by REF s. In other words, there are more unknowns than observations. As shown on FIG. 5, we first form the matrix $K_s$ 510 for the entire object. Then, we resample 530 the rows of the matrix $K_s$ 510 to reduce the number of unknowns and obtain a new matrix $\tilde{K}_s$ 520, which we then use in Equation (2).

We use a two step process. We first deblur the image to obtain an output image x at a low resolution. Then, we identify patches L, P and R. In one embodiment, we do this step manually. If we increase the resolution of patch P by s, then the available samples for patches L and R are $t-s*n^p$. Partitioning the number of samples, e.g., equally between L and R, the available samples for each of the patches L and R are $q=(t-s*n^p)/2$.

In another embodiment, we distribute samples according a relative size of patches R and L. We resample matrix $K_s$ 510 where for each row:
a. The first $s*n^l$ entries corresponding to patch L are resampled to length q.
b. The next $s*n^p$ entries corresponding to the patch P are kept as such.
c. The last $s*n^r$ entries corresponding to patch R are resampled to length q.

EFFECT OF THE INVENTION

The invention shows that motion blur can be used to increase a resolution of a moving object from a single image. Resolution enhancement is an ill-posed problem for images captured using a conventional camera. A coded exposure camera improves the invertibility of the resulting system.

Theoretical analysis of the relationship between the encoding pattern length, the size of the blur and the REF shows that the embodiments of the invention can handle a range of blur values and resolution enhancement factors. Results on up to four times resolution enhancement are possible. With selective enhancement, larger enhancement factors can be achieved.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for increasing a resolution of a moving object in an image acquired of a scene by a camera, comprising a processor for performing steps of the method, comprising the steps of:
temporally modulating, according to a temporally encoding pattern, an image acquired of a scene including a moving object while integrating the image in a camera sensor to produce a blurred input image; and
resolving the blurred input image according to the temporally encoding pattern to produce an enhanced and deblurred output image in which the object has an increased resolution by increasing a number of pixels in the object.

2. The method of the claim 1, wherein a resolution of the output image is a function of a resolution of the input image.

3. The method of the claim 1, wherein the object is blurred as a result of relative motion between the object and a camera.

4. The method of the claim 3, wherein a size of a blur of the blurred object is sufficiently large.

5. The method of the claim 1, wherein the object is moving in a plane of focus.

6. The method of the claim 1, wherein the object is moving substantially coplanar to an image sensor.

7. The method of the claim 1, wherein a point spread function is changed from a low pass box filter to a broadband filter.

8. The method of the claim 1, wherein the increased resolution is a result of a process for inverting the combined effects of point spread functions of a sensor and a motion.

9. The method of the claim 1, in which the resolving step further comprises:
finding a solution of a linear system $D_s*A_s*x_s=b$, where * denotes a convolution, $D_s$ is a decimation matrix due to a sensor, $A_s$ is a smearing matrix due to a motion, $x_s$ is the output image, b is the input image, and wherein the smearing matrix is coded according to the encoding pattern.

10. The method of the claim 1, wherein the encoding pattern is based on maximizing a minimum of a fast Fourier transform of a zero padded code.

11. The method of the claim 1, wherein the object is a patch on a bigger object, and the object is blurred with a sufficiently large size of the blur.

12. The method of the claim 11, wherein the bigger object is blurred with an insufficiently large size of the blur.

13. The method of claim 1, wherein the resolution of the object is increased without increasing the overall resolution of the output image.

14. The method of claim 1, wherein the number of pixels is increased along a direction of motion of the object.

15. The method of claim 14, further comprising:
inverting the combined effect of the motion of the object and a motion of the camera sensor.

16. The method of claim 1, wherein a motion blur in the input image is larger than the size of the object in a direction of the motion of the object.

17. A system for increasing a resolution of a moving object in an image acquired of a scene by a camera, comprising:
means for temporally modulating, according to a temporally encoding pattern, an image acquired of a scene including a moving object while integrating the image in a camera sensor to produce a blurred input image; and
means for resolving the blurred input image according to the temporally encoding pattern to produce an enhanced and deblurred output image in which the object has an increased resolution by increasing a number of pixels in the object.

* * * * *